F. FLEMING.
LUBRICATING SYSTEM.
APPLICATION FILED APR. 11, 1914.
1,178,999.
Patented Apr. 11, 1916.
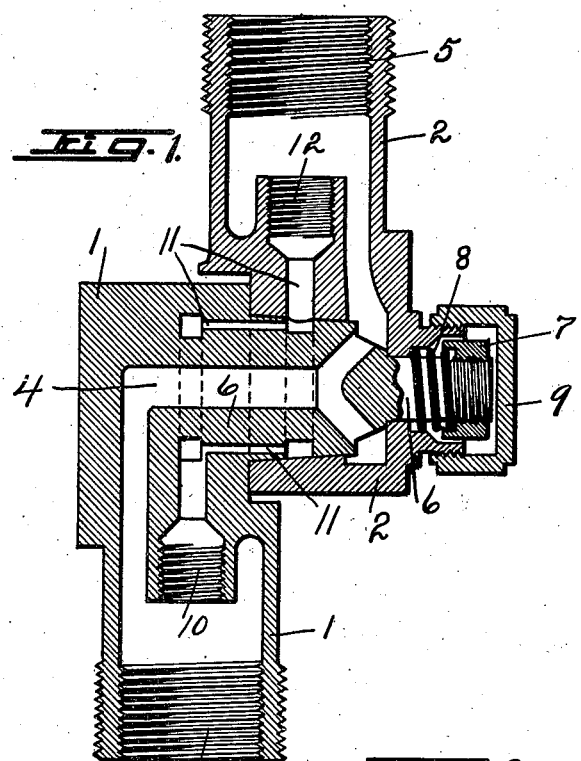
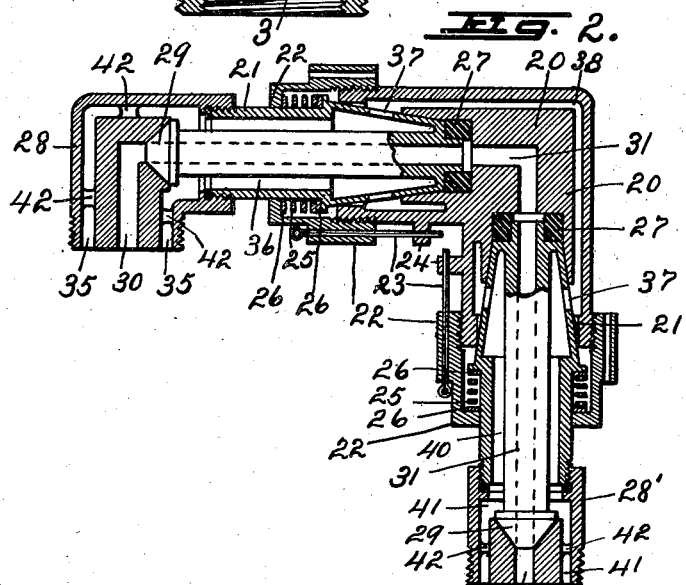
WITNESSES:
INVENTOR
F. Fleming
BY Howard P. Denison
ATTORNEY.

UNITED STATES PATENT OFFICE.

FRANK FLEMING, OF SACRAMENTO, CALIFORNIA.

LUBRICATING SYSTEM.

1,178,999.      Specification of Letters Patent.    Patented Apr. 11, 1916.

Original application filed January 13, 1912, Serial No. 671,054. Divided and this application filed April 11, 1914. Serial No. 831,333.

*To all whom it may concern:*

Be it known that I, FRANK FLEMING, a citizen of the United States, residing at Sacramento, in the county of Sacramento and State of California, have invented certain new and useful Improvements in Lubricating Systems, of which the following, taken in connection with the accompanying drawings, is a full, clear, and exact description.

This invention relates to certain improvements in lubricating systems, and refers more particularly to flexible pipe couplings therefor in which the sections of the coupling are turnable one upon the other with a fluid-tight joint, and is particularly adapted for use in connection with the lubricating system forming the subject-matter of my pending application, Serial No. 671,054, filed January 13, 1912, of which the present application is a division.

The main object is to permit an uninterrupted flow of lubricant through the various forms of couplings and joints to a multiplicity of bearings or other parts which are to be lubricated without liability of leakage at such joints, and at the same time to accelerate the flow of the lubricant through such couplings or joints as well as other parts of the piping system, and to the bearings by passing a heating fluid through the same pipes and couplings without liability of communication with the lubricant.

Another object is to maintain a fluid-tight turning joint between the coupling sections.

A further object is to maintain the continuity of each passage in any position of rotary adjustment of either of the coupling sections by extending a portion of at least one of the passages entirely around the turning joint, so as to also accelerate the flow of the lubricant by increasing its fluidity.

Other objects and uses will be brought out in the following description.

In the drawings Figure 1 is a sectional view of a coupling for pipes extending in the same general direction. Fig. 2 is a sectional view of an elbow coupling for pipes leading in different directions.

The coupling shown in Fig. 1 comprises a male member —1— and a female member —2—, the member —1— being provided with a lateral projection fitting with a fluid-tight joint into a correspondingly tapered socket in the member —2—, and terminates in a cylindrical threaded member —6— fitting with a fluid-tight joint in a corresponding opening in the section —2— and is threaded at its outer end for receiving a nut —7—.

A coil spring —8— surrounds the cylindrical portion —6— between the nut —7— and adjacent portion of the coupling —2— to draw the tapered projection of the section —1— into close engagement with the socket —2— for maintaining a tight joint, or rather for holding the coupling sections in operative relation and still permit one section to be turned upon the other, the turning joint being protected from dust and other foreign matter by a cap —9— which is screwed upon the adjacent portion of the coupling —2—, thereby forming a housing for the nut —7— and spring —8—.

The main bodies of the coupling sections —1— and —2— are disposed in planes at substantially right angles to the axis of their turning connections one upon the other, and are provided with non-communicating passages therethrough for the transmission of a lubricating fluid, as oil, and a heating fluid, as steam, respectively, the section —1— being provided with an inlet —3— for the lubricant and a co-axial inlet —10— for the heating fluid, as steam. The inlet —3— communicates with a passage —4— which extends lengthwise of the section —1— and laterally through the tapering offset thereof and terminates in branch passages opening into a passage —5— in the coupling section —2—, thus forming a continuous passage for the lubricating fluid entirely through both coupling sections. The portion of the passage —5— of the coupling section —2— which communicates directly with the branch passages of the passage —4— in the section —1— extends entirely around the adjacent portion of the lateral projection —6— so as to maintain open communication entirely through both coupling sections in any position of adjustment of either section. The steam inlet —10— communicates with a lateral passage —11— in the section —1— leading to a steam outlet —12— in the section —2—, thereby forming a continuous passage for the steam through both couplings independently of the passages 3, 4 and 5. The oil inlet end of the section —1— and also the oil outlet end of the section —2— are threaded for receiving suitable pipe connections (not shown) by which the lubricant may be conducted to the desired localities. In like manner the steam inlet end of the section —1— and the steam outlet end of the section —2— are also threaded for receiving suitable pipe connections (not shown), whereby the steam may be conducted entirely through the coupling sections. In this particular form of my invention, the steam inlet —10— and its outlet —12— are co-axial with the corresponding oil inlet —3— and oil outlet —5—, respectively.

The portions of the coupling sections —1— and —2— in which the inlets —10— and —12— are formed are somewhat smaller than the corresponding portions of the same parts in which the oil inlet —3— and outlet —5— are formed, so that the oil inlet and outlet surround the corresponding steam inlet and its outlet, the heat of the steam serving to liquefy the oil and accelerate its passage through the coupling sections. The portion of the steam passage which extends through the lateral offset of the section —1— extends entirely around the corresponding portion of the oil passage so as to maintain open communication between both ends of the steam passage through the turning joint in all positions of adjustment of either of the coupling sections, and also serving to accelerate the flow of the lubricant through the passage —4— and into the passage —5— by heating such lubricant.

The elbow coupling shown in Fig. 2 comprises an angular female section —20— having tapering sockets in its opposite ends for receiving the correspondingly tapering ends of male sections —21—, the tapering portions of said sections forming fluid-tight connections and permitting them to be turned one upon the other. The ends of the branches of the elbow section —20— are threaded externally for receiving suitable unions —22— screwed thereon for holding the sections —21— in operative connection with the section —20—, and when properly adjusted are held against further turning by cotter pins or keys —23— which are passed through apertures in one side of the unions —22— and engage in apertured lugs —24— on the corresponding sides of the elbow section —20—. The tapering portions of the sections —21— are held to their seats by coil springs —25— interposed between the outer ends of the unions —22— and suitable shoulders on the sections —21—, the ends of the springs bearing against hardened washers —26— to allow the sections —21— to turn more freely without necessarily turning the springs. Suitable gaskets or packings —27— of rubber or equivalent material are interposed between the inner ends of the sections —21— and corresponding ends of the tapering sockets in the section —20— to further prevent leakage of steam at the turning joint.

The coupling sections —21— are provided with outer and inner tubular parts concentric with each other, the outer ends of the outer parts being threaded for receiving threaded nipples —28— and —28'—, respectively, each nipple being provided with a conical valve seat for receiving similarly formed valves —29— on the outer ends of the inner tubular parts and allowing the nipples to be turned to establish fluid-tight joints with the cone valves —29—. The nipple —28— is provided with a steam inlet passage —30— communicating with an elbow passage —31— in the elbow section —20— through the central opening in the inner tubular part of the corresponding coupling section —21—, the elbow passage —31— communicating with an outlet —32— in the nipple —28'— through the opening in the inner tubular part of the adjacent coupling section —21—, thereby establishing a continuous steam passage through the coupling sections and nipples. The nipple —28— is also provided with an additional oil passage —35— surrounding the steam passage —30— and communicating with a passage —36— between the inner and outer tubular parts of the coupling section —21—, the passage —36— being provided with lateral branches —37— communicating with an elbow passage —38— in the elbow section —20— and thence through branches —37— in the other coupling section —21— with an annular space —40— between the inner and outer tubular parts of said section, and thence to the oil outlet passage —40— in the nipple —28'—. The steam inlet —30— and its outlet passage —32— are formed in inner tubular portions of their respective nipples —28— and —28'— which inner tubular portions are united to the outer portions of said nipples by ties —42— arranged at intervals circumferentially so as to allow the oil passages —35— and —41— in the nipples to entirely surround the inner steam passages —30— and —32—. In like manner, the passages —36— and —40— surround the inner passages —31— in the coupling sections —21— so that the heat of the steam passing through the coupling sections will accelerate the flow of the oil through the same sections, but wholly independent of the steam passage. It will be observed from the foregoing description that both of these couplings are provided with non-communicating passages therethrough, one for the lubricating fluid and the other for the heating fluid, and while I have described these two specific forms of my invention, it is evident that certain parts thereof may be substituted by equivalent parts without departing from the spirit of this invention, and therefore, I do not limit myself to the structure shown and described.

I claim:

1. In a lubricating system a flexible pipe coupling comprising telescoping sections turnable one upon the other with a fluid-tight joint, said sections having non-communicating passages therethrough for a lubricating fluid and a heating fluid, respectively, one of said passages having a portion thereof communicating with the turning joint at all points in its circumference, the portions of the passages at the terminal ends of the coupling being concentric for connection with pipes having similar concentric passages.

2. In a lubricating system a pipe coupling comprising telescoping pipe sections turnable one upon the other with a fluid-tight joint and having non-communicating passages therethrough for a lubricating fluid and a heating fluid, respectively, one of the passages having a portion thereof surrounding a portion of the other passage, the portions of the passages at the terminal ends of the coupling being concentric for connection with pipes having similar concentric passages.

3. In a lubricating system a pipe coupling comprising two hollow sections having respectively a tapering socket and a tapering projection fitting thereinto and forming a fluid-tight turning joint, said coupling having non-communicating passages, each extending continuously through both sections for conducting oil and steam respectively, the portions of the passages at the terminal ends of the coupling being concentric for connection with pipes having similar concentric passages.

4. In a lubricating system a pipe coupling comprising two hollow sections, one of said sections having a tapered socket in one side, the other section having a tapered end fitted in said socket to form a fluid-tight joint, said coupling having non-communicating passages therethrough for oil and steam, respectively, the portions of the passages at the terminal ends of the coupling being concentric for connection with pipes having similar concentric passages.

5. In a lubricating system a pipe coupling comprising two pipe sections, one of said sections having one end branched off at an angle to its opposite end, the other section having fluid-tight turning connection with said branch, said coupling having non-communicating passages therethrough for oil and steam, respectively, both passages being continuous through the turning connection, the portions of the passages at the terminal ends of the coupling being concentric for connection with pipes having similar concentric passages.

6. In a lubricating system, a flexible pipe joint comprising two pipe sections journaled one upon the other, each section having non-communicating passages therethrough for a lubricating fluid and a heating fluid, respectively, one of the passages being surrounded throughout the greater portion of its length in said joint by the other passage so as to cause a more uniform heating of the lubricating fluid at all points in the cross sectional area of its passage.

7. In a lubricating system, a pipe coupling comprising telescoping sections turnable one upon the other with a fluid-tight joint and having non-communicating passages therethrough for a lubricating fluid and a heating fluid, respectively, one of the passages through the turning joint being coaxial with the turning axis, and the other passage extending entirely around the central passage.

8. In a lubricating system, a pipe coupling comprising telescoping pipe sections fitted one within the other with a taper fit and provided with concentric non-communicating passages for a lubricating fluid and a heating fluid, respectively.

9. In a lubricating system, a pipe coupling comprising telescoping pipe sections fitted one within the other with a taper fit and provided with concentric non-communicating passages for a lubricating fluid and a heating fluid, respectively, and means for yieldingly forcing one section into the other in the direction of the taper.

10. In a lubricating system, a flexible pipe joint having an elbow section, each branch of which is provided with concentric non-communicating passages for oil and steam, respectively, and another section telescoping with one of the branches of the elbow section and also provided with concentric non-communicating passages, each communicating with the corresponding passage in the elbow section.

11. In a lubricating system, a flexible pipe joint comprising an elbow section having concentric non-communicating passages for oil and steam, respectively, through both branches thereof, one of the branches having a tapering socket in one end, another section having a tapering end fitting in said socket and also provided with concentric non-communicating passages, respectively, with the adjacent ends of the first named passages to form continuations thereof.

12. In a lubricating system, a flexible pipe joint comprising an elbow section having concentric non-communicating passages through both branches for oil and steam, respectively, the ends of both branches being provided with tapering sockets, additional sections having tapering ends fitted in said sockets to turn therein and each provided with concentric non-communicating passages registering with the adjacent ends of the corresponding passages in the elbow section to form continuations thereof.

13. In a lubricating system, a flexible pipe joint having telescoping sections turnable one within the other and each provided with concentric non-communicating passages therethrough for oil and steam, respectively, the adjacent ends of corresponding passages registering with each other, a union screwing upon one of the sections and surrounding a portion of the other section, said union and the last named section being provided with annular shoulders in spaced relation, and a coil spring interposed between said shoulders to yieldingly hold the sections in operative relation.

14. In a lubricating system, a flexible pipe joint having telescoping sections turnable one within the other and each provided with concentric non-communicating passages therethrough for oil and steam, respectively, the adjacent ends of corresponding passages registering with each other, a union screwing upon one of the sections and surrounding a portion of the other section, said union and the last named section being provided with annular shoulders in spaced relation, a coil spring interposed between said shoulders to yieldingly hold the sections in operative relation, and movable means for locking the union in its adjusted position.

FRANK FLEMING.

Witnesses:
J. W. Crawley,
H. G. Frey.